United States Patent [19]

Deki

[11] Patent Number: 4,720,832
[45] Date of Patent: Jan. 19, 1988

[54] GAS LASER INCLUDING MEANS FOR MAGNETIC DEFLECTION OF IONS

[75] Inventor: Kyoichi Deki, Himeji, Japan

[73] Assignee: Ushio Denki, Tokyo, Japan

[21] Appl. No.: 883,805

[22] Filed: Jul. 9, 1986

[30] Foreign Application Priority Data

Sep. 21, 1985 [JP] Japan .................................. 60-207796

[51] Int. Cl.⁴ .............................................. H01S 3/097
[52] U.S. Cl. ........................................ 372/37; 372/33; 372/109
[58] Field of Search .................... 372/37, 61, 33, 109, 372/56, 57, 103

[56] References Cited

U.S. PATENT DOCUMENTS

| | | | |
|---|---|---|---|
| 3,500,242 | 3/1970 | Young | 372/33 |
| 3,678,409 | 7/1972 | Rose | 372/37 |
| 4,672,615 | 6/1987 | Kelly et al. | 372/37 |

Primary Examiner—James W. Davie
Assistant Examiner—Xuan Vo
Attorney, Agent, or Firm—Armstrong, Nikaido, Marmelstein & Kubovcik

[57] ABSTRACT

An apparatus for preventing an optical element of a gas laser from being contaminated by vapor. This apparatus comprises pairs of magnets which apply magnetic fields to charged particles moving in the direction of the optical axis of the gas laser so as to deflect them transversely to the optical axis, and a screen for intercepting charged particles moving transversely to the optical axis of the gas laser.

7 Claims, 3 Drawing Figures

GAS LASER INCLUDING MEANS FOR MAGNETIC DEFLECTION OF IONS

BACKGROUND OF THE INVENTION

1. Field of the Invention

This invention relates to a gas laser such as a discharge-excited gas laser and more particularly to apparatus for preventing an optical element, such as an output window and a mirror, of a gas laser from being contaminated by vapor.

2. Description of the Prior Art

A discharge-excited gas laser such as an excimer laser can oscillate in a pulse discharge mode at gas pressure of 2 or 3 atm, and produces an impulse wave during the discharge. The ions such as $Al^{3+}$, $C^{4+}$ generated from electrode materials have components which move in the direction of the optical axis. Therefore, these ions are diposited on the laser mirrors or the windows in the form of a thin film. The thin film suppresses the laser oscillation and causes a reduction in the power output, which in turn requires a frequent cleaning.

Hitherto, a contamination prevention method as shown in FIG. 2 has been proposed. More specifically, a gas generated in the laser tube 21 containing impurities is introduced into another container 23 where the impurities are trapped by an electrostatic cleaner 24. The purified gas is blown towards the mirror or the window, perpendicularly to the optical axis, so as to prevent deposition of the impurity on the mirror or the window 22. This method, however, requires a large-scaled apparatus and the cost is increased undesirably.

Thus, no means has been available which is inexpensive, easy to handle and effective in the prevention of deposition of the contaminant. This imposes a serious problem particularly in the case of a discharge-excited excimer laser.

SUMMARY OF THE INVENTION

It is an object of this invention to overcome the said problems by providing a comparatively inexpensive and compact apparatus for preventing an optical element, such as an output window and a mirror, of a gas laser from being contaminated by vapor.

This apparatus comprises a magnet which applies magnetic fields to charged particles moving in the direction of the optical axis so as to deflect them and a screen for intercepting charged particles moving in different directions to the optical axis of the gas laser.

Other objects and advantages of this invention will become apparent from the following description of the preferred form of the invention which is illustrated in the drawings accompanying and forming part of this specification.

DESCRIPTION OF THE PREFERRED EMBODIMENT

Figure 1:
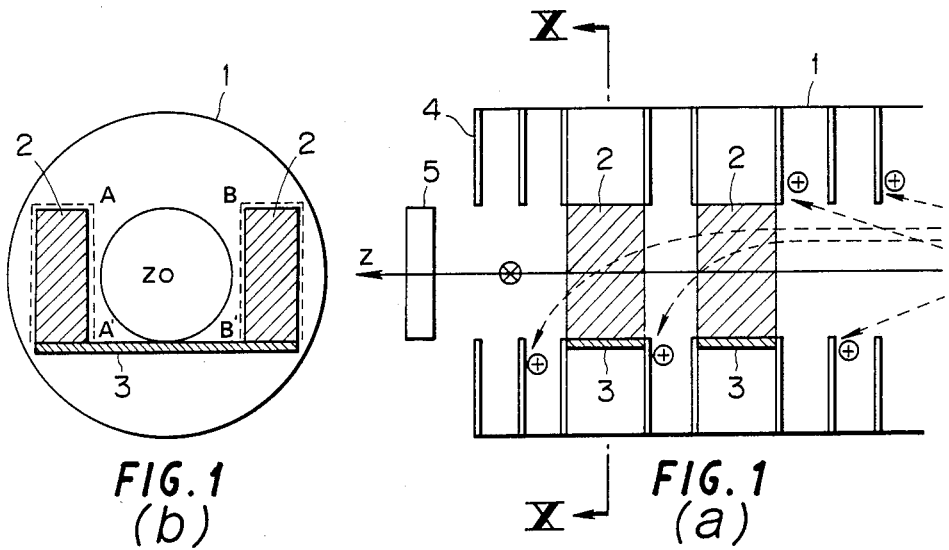
FIG. 1(a) is a side elevational view of an embodiment of this invention.
FIG. 1(b) is a cross-sectional view of the invention shown in FIG. 1(a) in the direction of the arrows along line X—X in FIG. 1(a).
Figure 2:
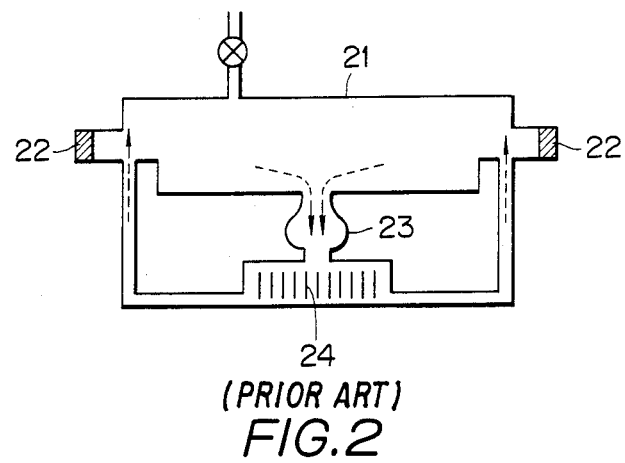
FIG. 2 is a side elevational view of a gas laser of the prior art.

FIG. 1(a) and FIG. 1(b) are illustrations of an embodiment of a contamination prevention device in accordance with this invention. The device 1 may be a series of diaphragms 4 and a pair of permanent magnets 2, and it is arranged in a cylindrical form. The diaphragm 4 may be made of an annular disk of Ni or Teflon ("Teflon" is the trademark for polytetrafluoroethylene) or other suitable material. The permanent magnets 2 may be ferrite magnets which are available commercially and have surfaces coated with Teflon for preventing reaction with a halogen. The permanent magnets 2 are connected to a Ni or ferromagnetic plate 3, in order to increase magnetic field strength in the gap AA'-BB'. It is thus possible to produce a magnetic field of 0.5 to 1K Oe in the gap of 30 to 40 mm.

The cylindrical contamination prevention device 1 of the invention is disposed in the vicinity of a laser window 5 in such a manner that the axis of the cylinder coincides with the laser beam axis.

It is assumed here that the impurity ions are formed in the discharge region which is located in right hand side of FIG. 1(a). The impurities usually have velocity (V) of about 300 m/sec. The path of flow of ions is deflected in the region near the permanent magnets 2 by the Lorentz force. Larmor radius, for a charged particle moving in a uniform magnetic field, is the radius of curvature of the projection of its path on a plane perpendicular to the field. Assuming here that the magnetic field intensity B is several hundreds to 1 Kilogauss, and $Al^{+3}$ and $C^{4+}$ are the impurity ions, the Larmor radius a is shown as follows.

$$a = mV/qB \lesssim 10 \text{ mm}$$

Where, q is the electric charge of ions and m is the mass of ions.

It is clear that most of the impurity ions flying at inclination to the optical axis will be trapped by the diaphragm before they reach the pair of permanent magnets 2.

The impurities, therefore, are prevented from reaching the laser window 5 but are deposited on the diaphragm 4, whereby contamination of laser optical elements is avoided.

Although only one embodiment of the invention has been disclosed and described, it is apparent that other embodiments and modification of the invention are possible.

What is claimed:

1. In a gas laser including optical elements arranged on an optical axis therein, an apparatus for preventing contamination of the optical elements by charged particles moving in the direction of the optical axis comprising:

a screen arranged to form a cylindrical path along said axis, such that particles moving in the axial direction and having motion transverse to said axis will impinge upon said screen; and means for applying a magnetic field across said cylindrical path so as to transversely deflect charged particles moving in the direction of said optical axis to impinge upon said screen.

2. An apparatus according to claim 1 wherein said means for applying a magnetic field comprises a pair of permanent magnets positioned on opposite sides of said cylindrical path.

3. An apparatus according to claim 2 wherein said permanent magnets are interconnected by a ferromagnetic plate.

4. An apparatus according to claim 1 wherein said screen is formed of a plurality of diaphragms.

5. An apparatus according to claim 4 wherein said diaphragms are in the form of annular discs.

6. An apparatus according to claim 1 wherein said means for applying a magnetic field is positioned near an optical element of said laser.

7. An apparatus according to claim 6 wherein said optical element is an output window of said gas laser.

* * * * *